US010489978B2

(12) United States Patent
Dimitrov et al.

(10) Patent No.: US 10,489,978 B2
(45) Date of Patent: Nov. 26, 2019

(54) SYSTEM AND METHOD FOR DISPLAYING COMPUTER-BASED CONTENT IN A VIRTUAL OR AUGMENTED ENVIRONMENT

(71) Applicants: Rouslan Lyubomirov Dimitrov, Santa Clara, CA (US); Allison Phuong Huynh, Palo Alto, CA (US)

(72) Inventors: Rouslan Lyubomirov Dimitrov, Santa Clara, CA (US); Allison Phuong Huynh, Palo Alto, CA (US)

( * ) Notice: Subject to any disclaimer, the term of this patent is extended or adjusted under 35 U.S.C. 154(b) by 0 days.

(21) Appl. No.: 15/341,812

(22) Filed: Nov. 2, 2016

(65) Prior Publication Data
US 2018/0033204 A1 Feb. 1, 2018

Related U.S. Application Data

(60) Provisional application No. 62/366,860, filed on Jul. 26, 2016.

(51) Int. Cl.
*G06F 3/01* (2006.01)
*G06T 19/00* (2011.01)
*G06F 3/0484* (2013.01)
*G06F 3/0481* (2013.01)
(Continued)

(52) U.S. Cl.
CPC ............ *G06T 19/006* (2013.01); *G06F 3/011* (2013.01); *G06F 3/013* (2013.01); *G06F 3/04815* (2013.01); *G06F 3/04845* (2013.01); *G06T 15/20* (2013.01); *G06F 3/0482* (2013.01)

(58) Field of Classification Search
CPC ......... G06F 3/011–018; G06F 3/04815; G06F 3/013; G06F 3/04845; G06F 3/0482; G06T 19/006; G06T 15/20; G06T 19/00–20
See application file for complete search history.

(56) References Cited

U.S. PATENT DOCUMENTS 6,031,519 A * 2/2000 O'Brien ............... G03H 1/0005
345/156
9,299,183 B2 * 3/2016 Vesely .................... G06F 3/012
(Continued)

OTHER PUBLICATIONS

Lang, Ben. "Envelop" Launches Open Beta of Immersive Windows Desktop Platform for Vive and Rift, Aug. 11, 2016, 2 pages.

*Primary Examiner* — Roberto W Flores
(74) *Attorney, Agent, or Firm* — Haynes and Boone, LLP

(57) ABSTRACT

A system and method for displaying computer-based content in a virtual or augmented environment includes receiving a selection of content for display on a window of a computing system, rendering the content as a virtual screen independently orientable from other virtual screens corresponding to other windows of the computing system, compositing the virtual screen into a virtual or augmented reality environment, detecting a selection of the virtual screen using a virtual controller, based on a gaze of a user within the virtual or augmented reality environment, or both, and changing properties of the virtual screen based on manipulation of the virtual controller by the user. In some embodiments, the system and method further include one or more of rendering a pointing ray and changing the properties based on movement of the virtual controller as if the virtual controller and the virtual screen are connected by a rigid link.

20 Claims, 5 Drawing Sheets

(51) Int. Cl.
  *G06T 15/20* (2011.01)
  *G06F 3/0482* (2013.01)

(56) References Cited

U.S. PATENT DOCUMENTS

| | | | |
|---|---|---|---|
| 2004/0046736 A1* | 3/2004 | Pryor | A63F 13/02 345/156 |
| 2006/0044265 A1* | 3/2006 | Min | G02B 27/017 345/156 |
| 2007/0176908 A1* | 8/2007 | Lipman | G06F 3/0386 345/179 |
| 2009/0189830 A1* | 7/2009 | Deering | G09G 3/02 345/1.3 |
| 2009/0189974 A1* | 7/2009 | Deering | G09G 3/02 348/46 |
| 2009/0289956 A1* | 11/2009 | Douris | G01C 21/3602 345/633 |
| 2010/0007602 A1* | 1/2010 | Tomisawa | G03B 37/04 345/156 |
| 2010/0013767 A1* | 1/2010 | Gu | G06F 3/014 345/158 |
| 2011/0164029 A1* | 7/2011 | King | G06F 3/04883 345/419 |
| 2011/0285704 A1* | 11/2011 | Takeda | A63F 13/10 345/419 |
| 2012/0019645 A1* | 1/2012 | Maltz | G02B 7/287 348/78 |
| 2012/0105312 A1* | 5/2012 | Helmes | G06F 3/016 345/156 |
| 2012/0206485 A1* | 8/2012 | Osterhout | G02B 27/0093 345/633 |
| 2012/0249741 A1* | 10/2012 | MacIocci | G06F 3/011 348/46 |
| 2012/0304059 A1* | 11/2012 | McCloskey | G06F 3/017 715/709 |
| 2012/0314934 A1* | 12/2012 | Kudo | G06F 3/04845 382/154 |
| 2013/0093756 A1* | 4/2013 | Davidson | G06F 3/04815 345/419 |
| 2013/0154913 A1* | 6/2013 | Genc | G06F 3/012 345/156 |
| 2013/0258207 A1* | 10/2013 | Kim | G08C 17/02 348/734 |
| 2013/0314320 A1* | 11/2013 | Hwang | G06F 3/0346 345/158 |
| 2013/0326364 A1* | 12/2013 | Latta | G06F 3/012 715/751 |
| 2013/0328925 A1* | 12/2013 | Latta | G09G 3/003 345/633 |
| 2014/0002351 A1* | 1/2014 | Nakayama | G06F 3/012 345/156 |
| 2014/0015831 A1* | 1/2014 | Kim | G06F 3/04815 345/419 |
| 2014/0104156 A1* | 4/2014 | Touma | G06F 3/014 345/156 |
| 2014/0347391 A1* | 11/2014 | Keane | G06T 19/006 345/633 |
| 2015/0143297 A1* | 5/2015 | Wheeler | G06F 3/0485 715/830 |
| 2015/0243082 A1* | 8/2015 | Ueno | G06T 19/20 345/633 |
| 2015/0363980 A1* | 12/2015 | Dorta | G06T 19/20 345/419 |
| 2016/0048204 A1* | 2/2016 | Scott | G06F 3/04845 345/156 |
| 2016/0063762 A1* | 3/2016 | Heuvel | G06F 3/011 345/633 |
| 2016/0225192 A1* | 8/2016 | Jones | G06F 3/012 |
| 2017/0185261 A1* | 6/2017 | Perez | G06F 3/04815 |
| 2017/0329419 A1* | 11/2017 | Dearman | G06F 3/0346 |
| 2017/0364198 A1* | 12/2017 | Yoganandan | G06F 3/0346 |
| 2018/0005438 A1* | 1/2018 | Mathey-Owens | G02B 27/0172 |

* cited by examiner

SYSTEM AND METHOD FOR DISPLAYING COMPUTER-BASED CONTENT IN A VIRTUAL OR AUGMENTED ENVIRONMENT

RELATED APPLICATIONS

The present application claims priority to U.S. Provisional Patent Application No. 62/366,860, entitled "System and Method for Displaying Computer-Based Content in a Virtual or Augmented Environment," filed Jul. 26, 2016, the entire disclosure of which is herein incorporated by reference.

TECHNICAL FIELD

The present disclosure relates generally to computing systems and the presentation of virtual and/or augmented environments and more specifically to displaying of computer-based content in a virtual and/or augmented environment.

BACKGROUND

The popularity of virtual and/or augmented reality systems is increasing. However, users of virtual and/or augmented reality systems, especially those using a head-mounted display, often have limited ability to interact with objects and the environment around them. This is especially true when users want to interact with windows and other non-virtual content available on their desktops, laptops, and/or tablets that is not part of the virtual and/or augmented environment which they are exploring. Accordingly, it would be advantageous to have a virtual and/or augmented reality system that allows users to select, display, and/or manipulate non-virtual content within their virtual and/or augmented environments.

SUMMARY

According to some embodiments, a method performed by one or more processors includes receiving a selection of content for display on a window of a computing system, rendering the content as a virtual screen independently orientable from one or more other virtual screens corresponding to other windows of the computing system, compositing the virtual screen into a virtual or augmented reality environment, detecting a selection of the virtual screen using a virtual controller, based on a gaze of a user within the virtual or augmented reality environment, or both, and changing one or more properties of the virtual screen based on manipulation of the virtual controller by the user.

According to some embodiments, a system includes a head-mounted display, a hand-held controller, and one or more processors. The one or more processors are coupled to the head-mounted display and the hand-held controller. The one or more processors are configured to receive a selection of content for display on a window of a computing system, render the content as a virtual screen independently orientable from one or more other virtual screens corresponding to other windows of the computing system, render the hand-held controller as a virtual controller within the virtual or augmented reality environment, composite the virtual screen and the virtual controller into a virtual or augmented reality environment displayed on the head-mounted display, detect a selection of the virtual screen or other virtual object using the virtual controller, based on a gaze of a user within the virtual or augmented reality environment, or both, and change one or more properties of the virtual screen or the other virtual object based on manipulation of the hand-held controller by the user.

According to some embodiments, a non-transitory computer-readable medium includes a plurality of machine-readable instructions which when executed by one or more processors associated with a virtual or augmented reality system are adapted to cause the one or more processors to perform a method. The method includes receiving a selection of content for display on a window of a computing system, rendering the content as a virtual screen as a virtual screen independently orientable from one or more other virtual screens corresponding to other windows of the computing system, rendering a hand-held controller as a virtual controller within the virtual or augmented reality environment, compositing the virtual screen into a virtual or augmented reality environment, detecting a selection of the virtual screen using the virtual controller, based on a gaze of a user within the virtual or augmented reality environment, or both, and changing one or more properties of the virtual screen based on manipulation of the virtual controller by a user.

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Figure 1:
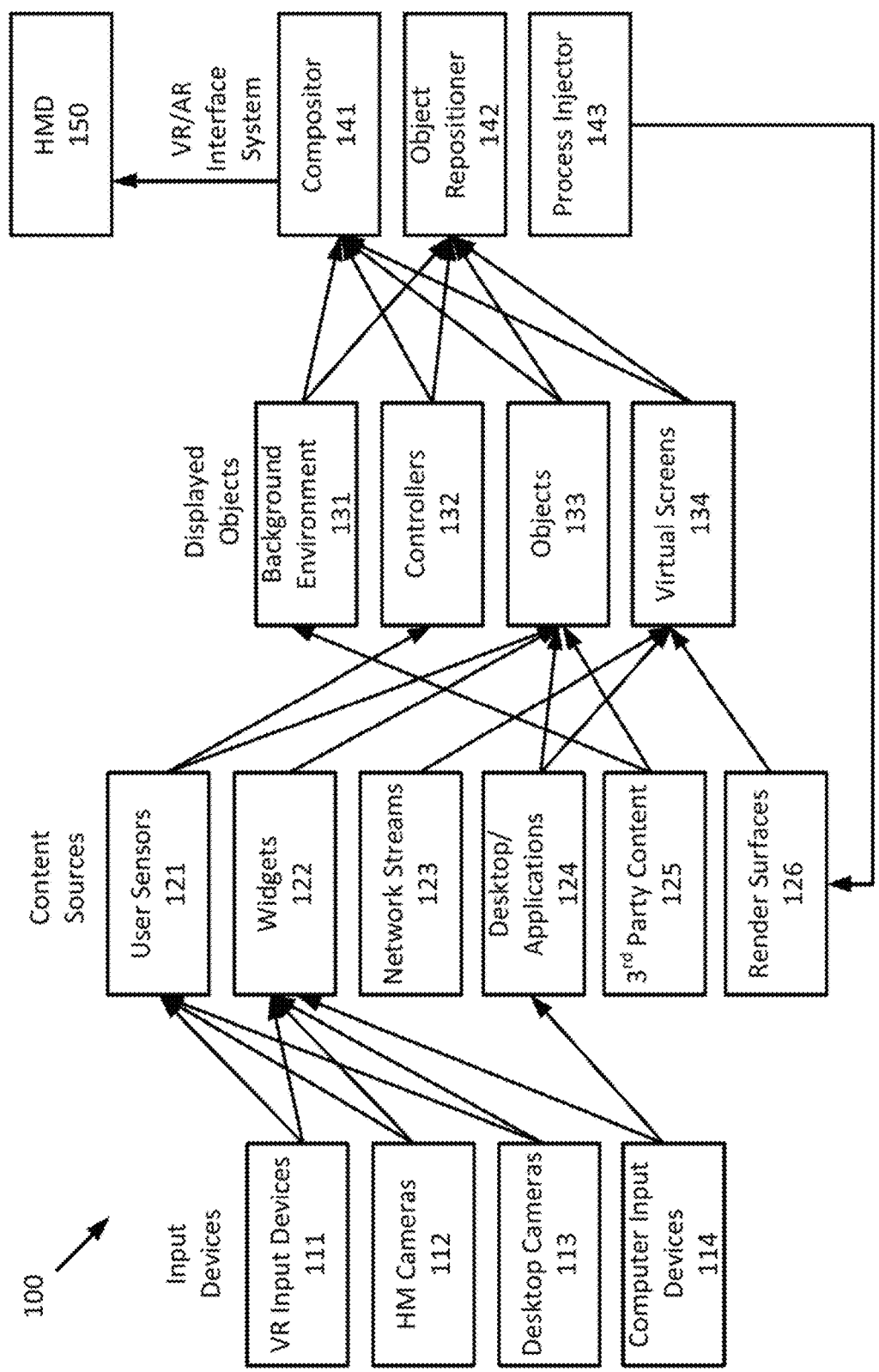
FIG. 1 is a simplified diagram of a computing environment according to some embodiments.

FIG. 1 is a simplified diagram of a computing environment 100 according to some embodiments. As shown in FIG. 1, the elements of computing environment 100 are grouped into input devices, content sources, displayed objects, and a virtual reality (VR) system. The elements of computing environment 100 cooperate to generate a virtual and/or augmented environment so that both virtual reality-based content, such as backgrounds, avatars, virtual objects and/or the like, may be displayed along with non-virtual reality-based content such as computer desktops, application screens and windows, steaming content received over a network, and/or the like. The combined content is then displayed to a user using, for example, a head-mounted display (HMD) 150.

The input devices of computing environment 100 include many different types of devices that are often used by computers, such as desktops, laptops, tablets, and/or the like, and/or virtual reality systems to receive user and/or user-related input. As shown, computing environment 100 includes one or more virtual reality input devices 111, one or more head-mounted (HM) cameras 112, one or more desktop cameras 113, and one or more computer input devices 114. The one or more virtual reality input devices 111 include input devices that may be used by a user in a virtual and/or augmented environment to manipulate objects and/or elements in the virtual and/or augmented environment. In some embodiments, the one or more virtual reality input devices 111 may include one or more positioning systems, tracking systems, accelerators, gyroscopes, cameras, and/or the like to track motion of the user's head, arms, hands, legs, feet, and/or the like. In some examples, the tracked motion may be evaluated to determine whether it corresponds to one or more inputs or commands to computing environment 100. Examples of systems and methods capable of interpreting tracked motions and movements as commands to a computing system are described further in U.S. Provisional Patent Application No. 62/349,612 (entitled "System And Method For A Blended Reality User Interface And Gesture Control System") filed Jun. 24, 2016, which is hereby incorporated by reference in its entirety. In some examples, the one or more virtual reality input devices 111 may be co-located with one or more of the one or more head-mounted cameras 112 and/or head-mounted display 150 in order to capture head movement of the user so as to be able to, for example, track the direction of the user's gaze so that as the user looks around the virtual and/or augmented environment, the portions of the virtual and/or augmented environment displayed on head-mounted display 150 is updated accordingly. In some examples, the one or more virtual reality input devices 111 may be associated with hand-held and/or worn devices, such as virtual reality controllers, game controllers, hand-held controllers, remote controls, data gloves, and/or the like. The hand-held and/or worn devices may then be monitored and/or tracked to allow the user to select elements from the virtual and/or augmented environment and manipulate them by moving them around, rotating them, and/or the like.

The one or more head-mounted cameras 112 may be used to capture the physical environment around the user. The images and/or video feeds captured by the one or more head-mounted cameras 112 may be used to provide content for the virtual and/or augmented environment, such as when the virtual and physical environments are blended. Examples of systems and methods capable of doing this are described further in U.S. Provisional Patent Application No. 62/349,612 (entitled "System And Method For A Blended Reality User Interface And Gesture Control System") filed Jun. 24, 2016, which is hereby incorporated by reference in its entirety. The images and/or video feeds may further be used to determine the location and/or orientation of the user's head to further support the one or more virtual reality input devices 111.

The one or more desktop cameras 113 may include one or more integrated and/or mounted cameras that may, for example, be used to capture the physical environment around the user and/or to capture images of the user. The images and/or video feeds captured by the one or more head-mounted cameras 112 may also be used to determine the location and/or orientation of the user's head, arms, hands, legs, feet, and/or the like to further support the one or more virtual reality input devices 111.

The one or more computer input devices 114 include one or more keyboards, keypads, mice, trackballs, touch pads, joy sticks, game controllers, and/or the like typically used to interact with desktop, laptop, tablet, and/or similar computing devices. Using the one or more computer input devices 114, the user may interact with the computer hosting the virtual reality system, select content, and/or direct the content for inclusion in the virtual and/or augmented environment as is discussed in further detail below.

The content sources of computing environment 100 include many different types of sources that may be used to provide visual and/or other content for inclusion in the virtual and/or augmented environment. As shown, computing environment 100 includes one or more user sensors 121, one or more widgets 122, one or more network streams 123, one or more desktops and/or applications 124, third party content 125, and/or one or more render surfaces 126. The one or more user sensors 121 provide content that is derived from the one or more virtual reality input devices 111, the one or more head-mounted cameras 112, and/or the one or more desktop cameras 113. In some examples, the one or more user sensors 121 may be used to capture information about the location, orientation, activity, and/or the like of the user that may be incorporated into the virtual and/or augmented environment. For example, input from the one or more virtual reality input devices 111 and/or one or more desktop cameras 113 may be used to capture the location, orientation, and/or activity of the user's hands so that virtual hands mimicking the behavior the user's hands may be included in the virtual and/or augmented environment. In some examples, the virtual hands may correspond to one or more of the one or more virtual controllers 132 so that movements and gestures made by the user's hands may be interpreted as inputs and/or other commands with the virtual and/or augmented environment. In some examples, the one or more user sensors 121 may further be used to track the one or more virtual reality input devices 111 so that virtual controllers, such as one or more of the one or more virtual controllers 132 and/or the one or more virtual objects 133, corresponding to the one or more virtual reality input devices 111 may be included in the virtual and/or augmented environment.

The one or more widgets 122 may include any virtual widgets corresponding to information received from any of the one or more virtual reality input devices 111, the one or more head-mounted cameras 112, the one or more desktop cameras 113, the one or more computer input devices 114, and/or the virtual reality system in general. In some examples, the widgets 122 may provide status information regarding the virtual reality system, the underlying computing system, and/or the like. In some examples, the one or more widgets 122 may include a monitor of central processing unit (CPU) temperature, CPU utilization, displayed frame rate, and/or the like. In some examples, the one or more widgets 122 used for monitoring may provide numeric information, an analog-style gauge, and/or the like. In some examples, the one or more widgets 122 may provide virtual analogs to input device information, such as providing a virtual video screen showing images and/or video feeds captured by the one or more head-mounted cameras 112 and/or the one or more desktop cameras 113. In some examples, the one or more widgets 122 may include tooltips and/or other help mechanisms to aid the user in using and/or navigating through the virtual and/or augmented environment. In some examples, the one or more widgets 122 providing tip and/or help information may be disabled by the user and/or be automatically phased out as the user becomes more familiar with the virtual and/or augmented environment. In some examples, the one or more widgets 122 may be displayed as one or more of the one or more virtual objects 133 within the virtual and/or augmented environment.

The one or more networks streams 123 correspond to content that may be included in the virtual and/or augmented environment over a network coupled to computing environment 100. In some examples, the one or more network streams 123 may include one or more video feeds, such as streaming television, one or more audio feeds, such as streaming radio, audio books, and/or the like, and/or streaming virtual reality content from other computing system, other virtual reality systems, other virtual reality users sharing their content, and/or the like. Each of the one or more network streams 123 may be displayed as one or more of the virtual screens 134 in the virtual and/or augmented environment.

The one or more desktops and/or applications 124 provide content that is currently being displayed on a desktop, laptop, tablet, and/or the like. In some examples, the content may include captures of an entire desktop, laptop, or tablet screen and/or may be limited to content displayed within a single application and/or window. In some examples, the user may use the one or more virtual reality input devices 111 and/or the one or more computer input devices 114 to select the desktops, applications, and/or windows to be displayed within the virtual and/or augmented environment. In some examples, the content may be selected using one or more specialized commands, application programming interface (API) calls, menu selections, hot keys, and/or the like. In some examples, the graphic content of the desktops, applications, and/or windows may be obtained by computing environment 100 through one or more specialized API calls of an underlying operating system, directly accessing display memory, and/or the like. Each of the one or more desktops and/or applications 124 may be displayed as one or more of the virtual screens 134 in the virtual and/or augmented environment. In some examples, when the underlying computing system includes more than one display, each display may be included in the virtual and/or augmented environment as a separate one of the one or more virtual screens 134. In some examples, the one or more desktops and/or applications 124 may also provide one or more of the one or more virtual objects 133 being displayed in the virtual and/or augmented environment. For example, an e-commerce application and/or an e-commerce web site may provide 3D models of virtual analogs to products for sale that may be displayed in the virtual and/or augmented environment and/or manipulated by the user using the one or more virtual reality input devices 111.

The third party content 125 may include content from third party sources including content stored locally as well as content accessed via a network. The third party content 125 may be relatively static and/or dynamic. In some examples, the third party content 125 may be streamed over the network in a similar fashion to the one or more network streams 123. In some examples, the third party content 125 may be obtained from one or more content stores, content repositories, social networks, crowd sources (e.g., content from the Steam Workshop), feeds, portals, other virtual and/or augmented reality systems, and/or the like. Depending upon the nature and/or content of the third party content 125, the third party content may be rendered as part of background and environment 131 and/or as one or more of the one or more virtual objects 133. In some examples, the third party content 125 may correspond to one or more avatars of other users sharing the virtual or augmented environment.

The one or more render surfaces 126 may correspond to one or more virtual surfaces within the virtual and/or augmented environment and/or one or more surfaces mapped to the desktops, applications, and/or windows being captured. Each of the one or more render surfaces 126 may be displayed as one or more of the virtual screens 134 in the virtual and/or augmented environment.

The displayed objects of computing environment 100 include many different types of elements that may be displayed in the virtual and/or augmented environment. As shown, computing environment 100 includes displayed objects that include background and environment 131, one or more virtual controllers 132, one or more virtual objects, one or more virtual screens 134, and/or the like. The background and environment 131 include displayed content elements that provide a backdrop for the virtual and/or augmented environment. The background and environment 131 may include any graphic content including images and/or artistic renditions of locations including famous locations, mundane locations, fictitious environments and landscapes, space scenes, and/or the like. In some examples, background and environment 131 may be different in different regions of the virtual and/or augmented environment, thus creating separate areas, rooms, zones, and/or the like. In some examples, choice of the background and environment 131 may be customized for each of the different regions to reflect a theme, purpose (e.g., a virtual office, a virtual recreation room, and/or the like), and/or the like of the respective region. The background and environment 131 may further be user customizable including the ability to recolor, reorient, scale, and/or the like, available content and/or the combine and/or otherwise blend content from multiple sources. In some examples, the background and environment may be received as part of the third party content 125. In some examples, the background and environment 131 may be modeled using one or more of 2D models, 3D models, tiling, wire frames, solid models, particle systems, and/or the like.

The one or more virtual controllers 132 include any of the virtual analogs to the one or more virtual reality input devices 111, the one or more head-mounted cameras 112, the one or more desktop cameras, the user's hands, and/or the one or more computer input devices 114 so that these virtual analogs may be interacted with and/or used by the user to manipulate the virtual and/or augmented environment. In some examples, the one or more virtual controllers 132 may include one or more virtual hands that may be moved around as the user's hands are tracked so that gestures made by the user's hand and thus the virtual hands are considered as possible commands and/or inputs within the virtual and/or augmented environment. In some examples, the one or virtual controllers 132 may include a virtual rendition of a hand-held virtual reality input device 111 that may be moved around and/or repositioned in the virtual and/or augmented environment so as to track the movement and operation of a corresponding virtual reality input device 111 as is described in further detail below. In some examples, the one or more virtual controllers 132 may include one or more virtual extensions, such as a pointing ray that may aid the user in manipulating the one or more virtual controllers 132 in the virtual and/or augmented environment. In some embodiments, the one or more virtual controllers 132 may be used to activate menus, use menus, and/or the like to select, manipulate, transform, etc. the one or more virtual objects 133 and/or the one or more virtual screens 134 in order to help build and/or manipulate the virtual and/or augmented environment.

The one or more virtual objects 133 include any of one or more widgets 122 and/or part of the third party content 125. In some examples, the one or more virtual objects 133 may be placed and/or oriented subject to input received from the one or more user sensors 121. For example, input from the one or more user sensors 121 may be used to detect user operations that correspond to a user grasping, moving, rotating, and/or otherwise manipulating one of the one or more virtual objects 133. In some examples, one or more of the one or more virtual objects 133 may be supplied as a corresponding 2D and/or 3D model by one or more of the one or more desktops and applications 124, such as to support an e-commerce application and/or web site, a third party content source, and/or the like. In some examples, the one or more virtual objects 133 may be modeled using one or more of tiling, wire frames, solid models, particle systems, and/or the like.

The one or more virtual screens 134 correspond to the locations within the virtual and/or augmented environment where the virtualized content from any of the one or more network streams 123, the one or more desktops or applications 124, and/or the one or more render surfaces 126 are displayed. Each of the one or more virtual screens 134 may be manipulated independently of each other. In some examples, each of the one or more virtual screens 134 may appear within the virtual and/or augmented environment as it they are a screen, window, sign, and/or the like physically suspended within the virtual and/or augmented environment. Depending upon their configurations, each of the one or more virtual screens 134 may be rendered as a flat or a curved surface. In some examples, visual content on the one or more virtual screens 134 may be rendered as monoscopic and/or stereoscopic content based on whether the source content is 2D or 3D. In some examples, content having a 3D encoding (e.g., content coded in the Side-by-Side (SBS) 3D encoding) may be rendered stereoscopically so that appears to be three-dimensional when rendered in the virtual and/or augmented environment.

In some embodiments, the content displayed on the one or more virtual screens 134 may include active content, user selectable and/or manipulatable elements and/or the like that are consistent with the content being displayed on the respective virtual screen 134. In some examples, the active content may include user interface elements, such as buttons and/or other controls, active regions, hyperlinks, and/or the like that may be activated on the respective virtual screen 134 within the virtual and/or augmented environment in much the same way corresponding user interfaces, web pages, and/or the like may be activated on a computer display. In some examples, activation of the controls, active regions, and/or hyperlinks may result in a change in content on the respective virtual screen 134, creation of a new virtual screen 134, cause the download and/or creation of new virtual objects 133, new elements in the background and environment 131, and/or the like. In some examples, an ecommerce website and/or application displayed in the virtual and/or augmented environment using one or more virtual screens 134 may be interacted with to view one or more virtual representations of objects for sale, view or more samples of content, and purchase one or more physical items, one or more virtual objects 133, content, and/or the like.

According to some embodiments, placement of a newly created virtual screen 134, virtual object 133, and/or element in the background and environment 131 may be constrained by virtual geometries of the virtual and/or augmented environment. In some examples, a placement location may be dependent upon the identification of a suitably sized flat area, such as a textured surface, to provide one or more attachment points for the newly created virtual screen 134, virtual object 133, and/or element in the background and environment 131. In some examples, the placement may further depend on the existence of a suitably sized volumetric space about the one or more attachment points (e.g., a ceiling fan may preferable be associated with a minimal clearance volume to allow the fan blades to spin without encountering other objects, elements, avatars, and/or the like). In some examples, the placement may further depend on an orientation of the one or more attachment points (e.g., a ceiling fan may be associated one or more attachment points on a flat surface oriented downward or mostly downward, a virtual screen 134 may be associated with one or more attachment points to a vertical or substantially vertical surface). In some examples, the placement may further depend on a type of texturing of the one or more attachment points. In some examples, when no suitable placement may be found for the new virtual screen 134, virtual object 133, and/or element in the background and environment 131, a suitable replacement virtual screen 134, virtual object 133, and/or element in the background and environment 131 may be recommended that is similar to and/or consistent with the virtual screen 134, virtual object 133, and/or element in the background and environment 131 that is not placeable. In some examples, the virtual screen 134, virtual object 133, and/or element in the background and environment 131 may be scaled, either automatically or based on user input, to fit the one or more attachment points and/or the available volumetric space.

In some embodiments, the one or more virtual screens 134 may also act as one or more artificial light sources that may be used to illuminate any of the background and environment 131, the one or more virtual controllers 132, and/or the one or more virtual objects also being displayed in the virtual and/or augmented environment. In this way, the one or more virtual screens 134 may be included within the virtual and/or augmented environment in a way that allows them to illuminate areas around them in much the same way a physical computer screen would light up a nearby physical environment. In some examples, each of the one or more virtual screens 134 may be modeled as separate point, directional, and/or area light sources.

In some embodiments, when the one or more virtual screens 134 include content with an audio component, such as a video sequence with sound, the one or more virtual screens 134 may further act as a sound source, which may be modeled either as a background sound source and/or a sound source with position and/or direction. In some example, the sound source may be modeled with a predetermined range so that the sound source may not be heard when the user is farther away than the predetermined range from the sound source. In some examples, known APIs such as OpenAL and/or DirectSound may be used to model the sound within the virtual and/or augmented environment so that a user with stereo and/or surround sound speakers may be able to perceive the sound as if the sound originated at the location and/or orientation of the corresponding virtual screen 134.

As shown, the virtual reality interface system of computing environment 100 includes a compositor 141, an object repositioner 142, and a process injector 143. Compositor 141 receives the content associated with background and environment 131, the one or more virtual controllers 132, the one or more virtual objects, and/or the one or more virtual screens 134 and generates the virtual and/or augmented environment for display to the user using head-mounted display 150. Compositor 141 includes support for graphical tools and/or the like useful for rendering immersive 3D virtual and/or augmented environments including support for depth or z-buffering to correctly obscure content hidden by content located closer to the user, lighting, blending, clipping, providing audio, and/or the like. In some examples, compositor 141 may use one or more of 2D modeling, 3D modeling, tiling, wire framing, solid modeling, particle modeling, ray tracing, shading, shadowing, and/or the like to composite any of the content in the virtual and/or augmented environment.

In some examples, when a render surface 126 is created for display as one of the one or more virtual screens 134, compositor 141 may grab the content for display in the one or more virtual screens 134 from the display buffer of the underlying computing system. In some examples, when compositor 141 grabs the content from display from the display buffer, compositor may have to generate one or more intermediate frames to convert between the frame rate of the display buffer and the frame rate of head-mounted display 150 (e.g., between the 60 Hz or similar frame rate at which display images are refreshed in the display buffer and the 90 Hz or similar frame rate used to refresh head-mounted display 150). In some examples, compositor 141 may alternatively use inter-process communication to start a thread in the remote process responsible for generating the content of the render surface 126 and the virtual screen 134. The thread may be used to capture the screen directly, detect data and/or metadata changes, and/or the like and relay that information back to the compositor 141 so that compositor 141 may more effectively and efficiently render and composite the content into the virtual screen 134. In some examples, use of the thread may also simplify synchronization of the content to be displayed within the virtual and/or augmented environment with the frame rate of head-mounted display so that intermediate frames to convert between the frame rate used by the display of the underlying computing system and the frame rate used by head-mounted display 150 do not have to be generated. In some examples, compositor 141 may further render one or more menus, one or more widgets, one or more gadgets, and/or the like to aid the user in manipulating the one or one or more virtual screens 134. In some examples, each of the one or more virtual screens 134 may have its own menu, widgets, gadgets, and/or the like. In some examples, compositor 141 may use one or more APIs, such as DirectX, OpenGL, and/or the like.

In some embodiments, because compositor 141 composites each of the one or more virtual screens 134 similarly to background and environment 131, the one or more virtual controllers 132, and/or the one more virtual objects 133, the user may navigate among an around the one or more virtual screens 134 within the virtual and/or augmented environment. In some examples, the user may navigate past, move behind, and/or otherwise place out of view any of the one or more virtual screens 134.

Head-mounted display 150 may provide support for two-dimensional monoscopic and/or three-dimensional stereoscopic images to the user. The virtual and/or augmented environment generated by compositor 141 and displayed by head-mounted display 150 may include static and/or dynamic images.

Object repositioner 142 provides the user with the ability to select objects in the virtual and/or augmented environment created by compositor 141 so that those objects may be repositioned, reoriented, rescaled, and/or the like. In some examples, this includes the ability to select and/or manipulate any of the background and environment 131, the one or more virtual controllers 132, the one or more virtual objects 133, and/or the one or more virtual screens 134. The role and function of object repositioner 142 is described in further detail below.

Process injector 143 gives the virtual reality interface system the ability to react to changes, such as those caused by user interaction, in the virtual and/or augmented environment that may result in creation of one or more of the one or more render surfaces 126. In some examples, process injector 143 may detect when a user opens new content, launches a new window to be displayed as a virtual screen 134 (e.g., by selecting and opening content within one of the desktops and/or applications 124), and/or the like. In some examples, when users open virtual objects (e.g., doors, boxes, etc.), turn on or off virtual appliances, activate new screens, and/or the like, process injector 143 creates one or more appropriate render surfaces 126 that may be added to the virtual and/or augmented environment. In some examples, when a render surface 126 is created by manipulation in the virtual and/or augmented environment for display as one of the one or more virtual screens 134, process injector 143 may set-up one or more threads to aid compositor 141 in capturing the content for display on the one or more virtual reality screens.

In some embodiments, the virtual reality system may further keep track of a state of the virtual and/or augmented environment to provide persistence in the virtual and/or augmented environment. In some examples, the virtual reality system may maintain of record of background and environment 131, one or more virtual controllers 132, one or more virtual objects, one or more virtual screens 134, and/or the like so that when a user returns to the virtual and/or augmented environment after quitting and/or restarting the virtual reality system, the virtual and/or augmented environment will be retained. In some examples, the state may include information on which applications are open; the orientations, transforms, history, content and/or the like of background and environment 131, one or more virtual controllers 132, one or more virtual objects, one or more virtual screens 134. In some examples, the state may be saved and/or recorded in one or more data structures, databases, files, and/or the like.

Figure 2:
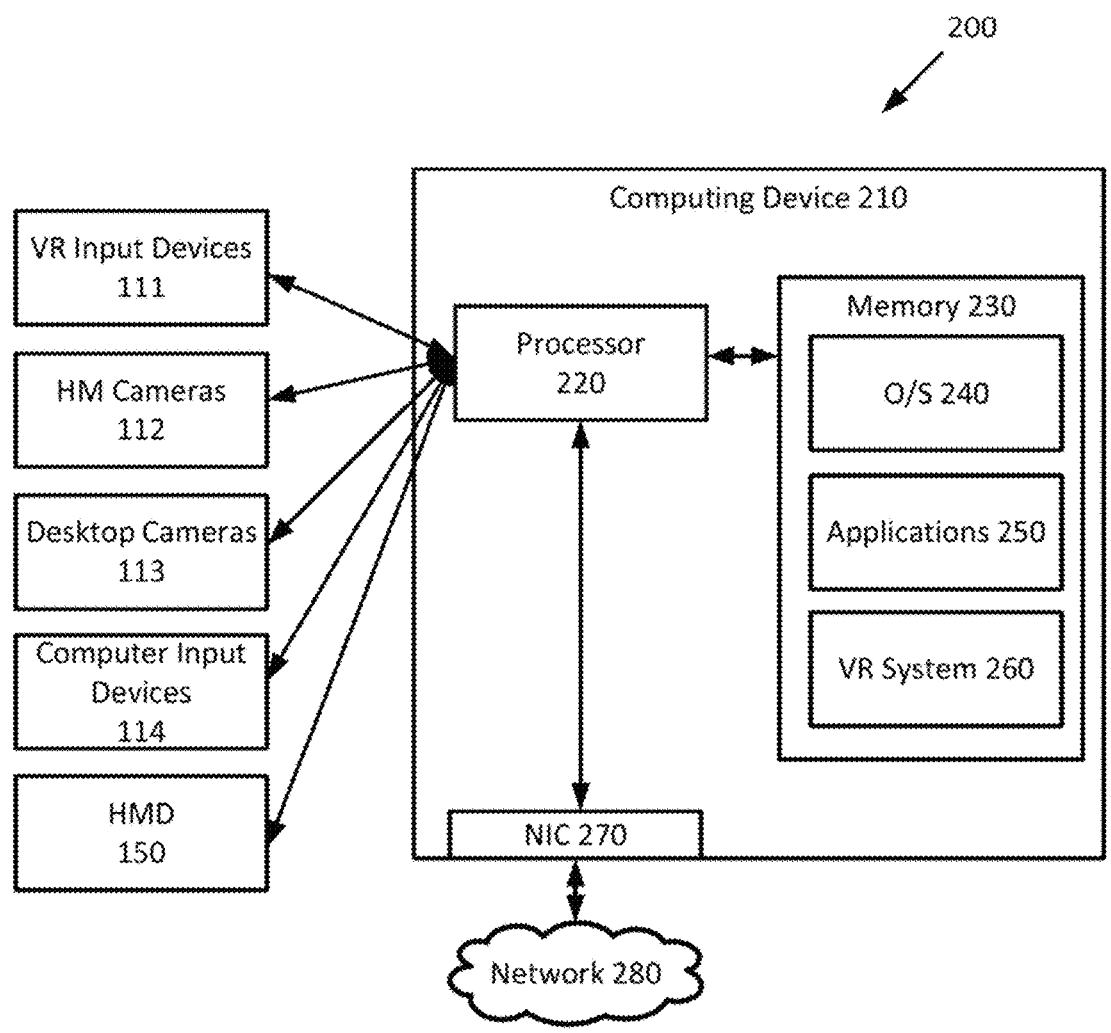
FIG. 2 is a simplified diagram of a computing system according to some embodiments.

FIG. 2 is a simplified diagram of a computing system 200 usable to implement the computing environment 100 according to some embodiments. As shown in FIG. 2, computing system 200 is built around a computing device 210, which may be representative of any desktop, laptop, tablet, server, or other computer with sufficient computing power to implement the virtual and/or augmented environment described above with respect to FIG. 1. Computing device 210 includes a processor 220 coupled to memory 230. Operation of computing device 210 is controlled by processor 220. And although computing device 210 is shown with only one processor 220, it is understood that processor 220 may be representative of one or more central processing units, multi-core processors, microprocessors, microcontrollers, digital signal processors, field programmable gate arrays (FPGAs), application specific integrated circuits (ASICs), and/or the like in computing device 210. Computing device 210 may be implemented as a stand-alone subsystem and/or as a virtual machine.

Memory 230 may be used to store software executed by the computing device 210, one or more data structures used during operation of computing device 210. Memory 230 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/ or any other medium from which a processor or computer is adapted to read.

Stored within memory 230 are several firmware and/or software components that may be executed by processor 220. These firmware and/or software components include an operating system 240, one or more applications 250, and a virtual reality system 260. Operating system 240 is responsible for providing the base operating system used by computing device 210 and may correspond to any version of Windows, iOS, OS X, Linux, Unix, and/or the like. Operating system 240 provides one or more APIs and/or libraries usable by the one or more applications 250 and/or virtual reality system 260 to interface with input and output devices, access networks, receive content, and/or the like. The input and output devices may include any of the one or more virtual reality input devices 111, the one or more head-mounted cameras 112, the one or more desktop cameras 113, the one or more computer input devices 114, and/or the head-mounted display 150. The one or more APIs and/or libraries may include APIs and/or libraries for navigating directories, selecting and opening files, graphical manipulation, sound processing, audio coder/decoders (CODECs), image CODECs, video CODECs, accessing video memory and/or other content displayed by computing device 210, and/or the like. In some examples, the one or more APIs and/or CODECs may include DirectSound, OpenAL, DirectX, OpenGL, and/or the like.

The one or more applications 250 include applications for generating and/or receiving content including web browsers, e-commerce applications, audio applications, image applications, video applications, drawing applications, and/or the like. The one or more applications 250 may additionally correspond to the one or more desktop and/or applications 124 that may provide content to the virtual and/or augmented environment.

Virtual reality system 260 generates the virtual and/or augmented environment displayed to the user via head-mounted display 150 and further provides a user with the ability to select and/or manipulate elements within the virtual and/or augmented environment. Virtual reality system 260 may include compositor 141, object repositioner 142, and/or process injector 143.

Computing device 210 further includes at least one network interface component (NIC) 270 that may be used to couple computing device 210 to an external network 280. External network 280 may correspond to any local area network (e.g., an Ethernet), wireless network (e.g., a wireless Ethernet), wide-area network (e.g., the Internet), and/or the like.

Figure 3:
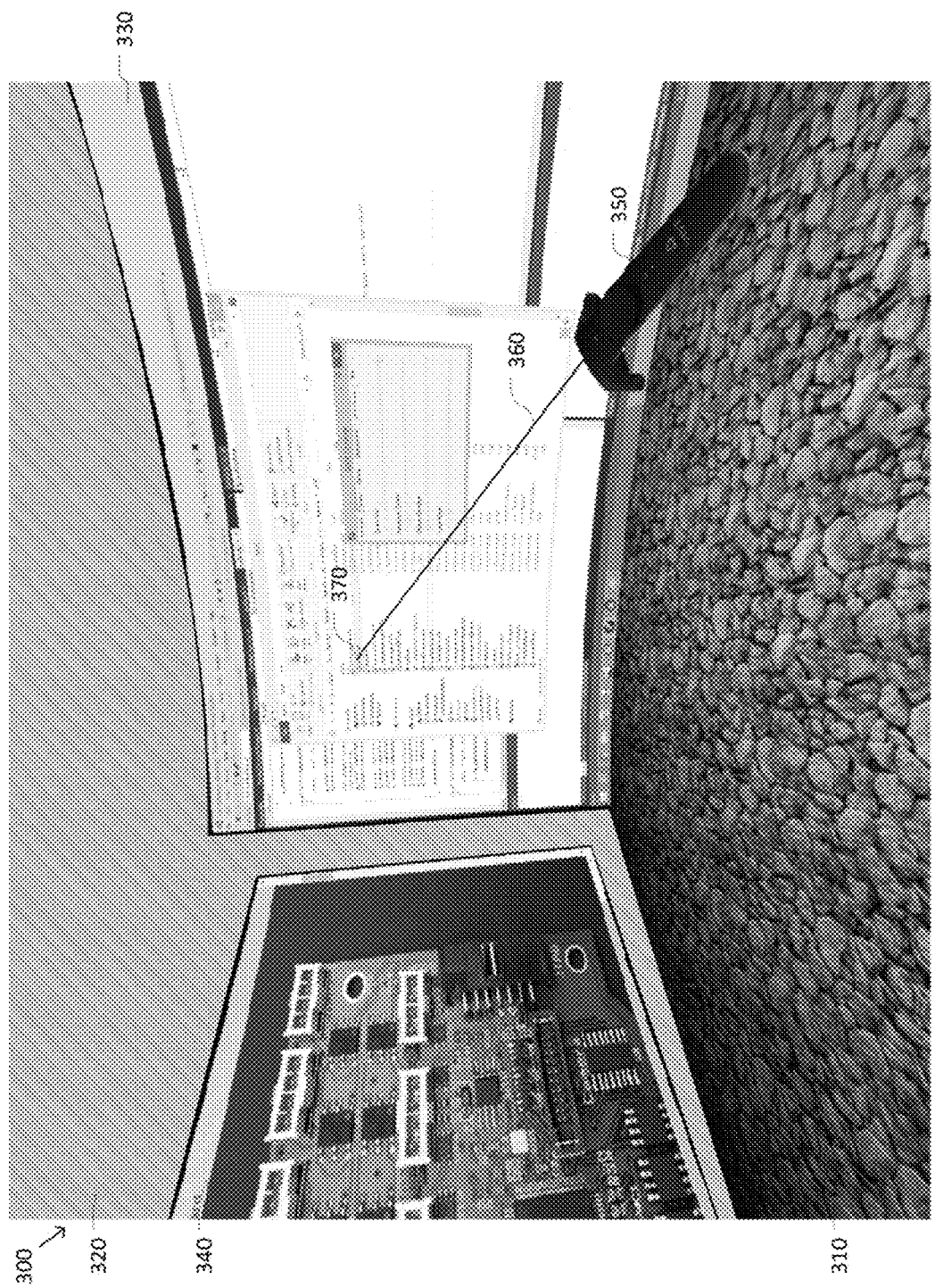
FIG. 3 is a simplified diagram of a virtual or augmented reality environment incorporating non-virtual content according to some embodiments.

FIG. 3 is a simplified diagram of a virtual and/or augmented environment 300 incorporating non-virtual reality content according to some embodiments. As shown in FIG. 3, virtual and/or augmented environment 300 includes both virtual reality and non-virtual reality content consistent with the descriptions of the virtual and/or augmented environment generated by the systems of FIGS. 1 and 2. For example, virtual and/or augmented environment 300 includes background elements including a pebbled floor 310 and a textured backdrop 320 consistent with background and environment 131. Virtual and/or augmented environment 300 further includes a virtual screen 330 and a virtual screen 340 consistent with the one or more virtual screens 134 that are, respectively, being used to display the contents of a desktop and a video or image stream that are consistent with the type of content provided by the one or more desktops and applications 124. As shown, virtual screen 330 is drawn as if being displayed on a curved surface and virtual screen 340 is drawn as if on a flat surface. Also shown in virtual and/or augmented environment 300 is a virtual controller 350 consistent with one of the one or more virtual controllers 132 and/or the one or more virtual reality input devices 111. Virtual controller 350 is directed toward a location 370 on virtual screen 330 as indicated by a pointing ray 360 drawn to aid the user in understanding how virtual controller 350 is being aimed. In some examples, when the direction of pointing ray 360 may intersect with two or more overlapping virtual screens (not expressly shown in FIG. 3), pointing ray 360 is extended until it reaches the virtual screen closest to virtual controller 350 along the direction of pointing ray 360.

Figure 4:
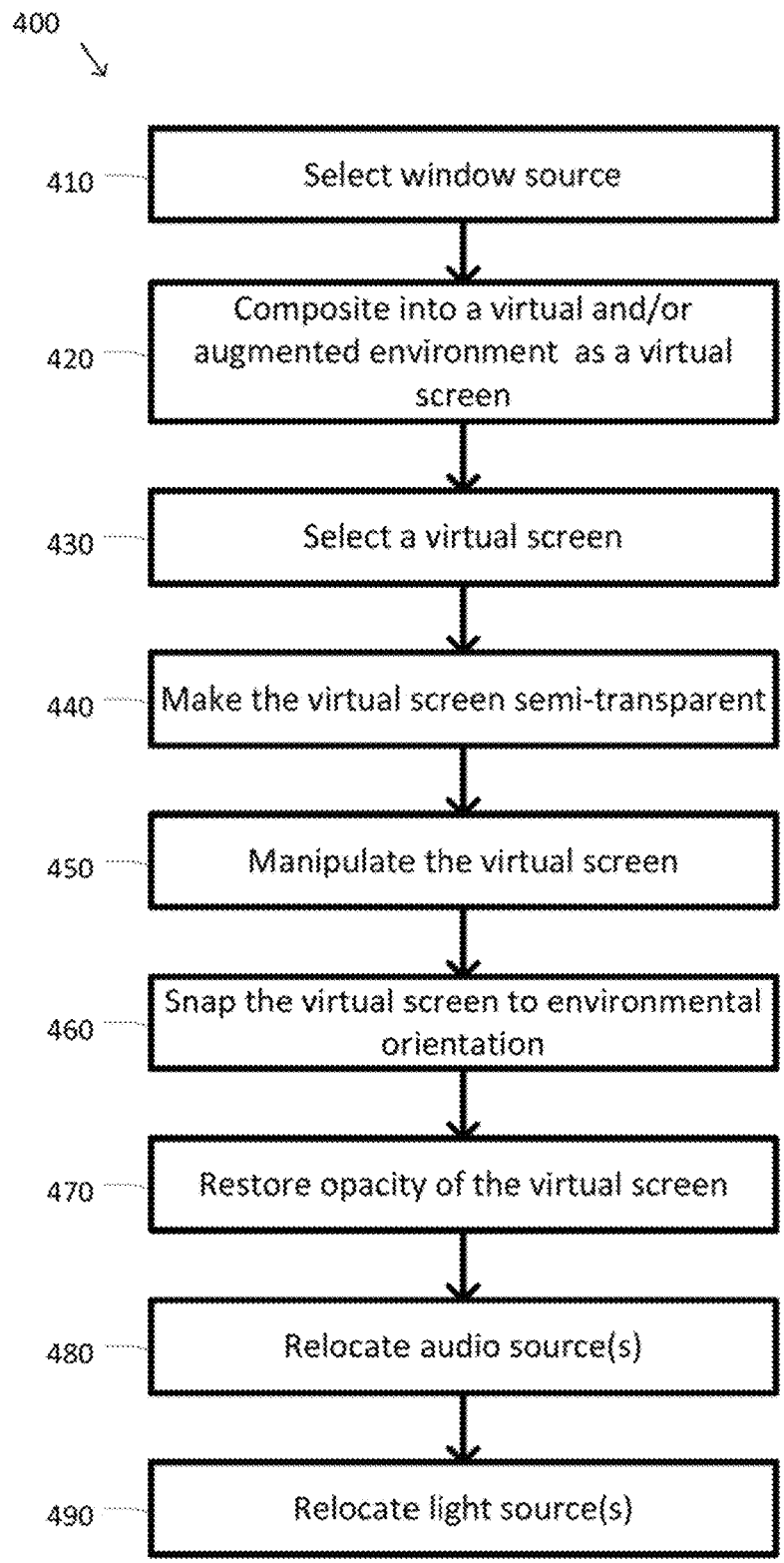
FIG. 4 is a simplified diagram of a method of incorporating non-virtual content in a virtual or augmented reality environment according to some embodiments.

FIG. 4 is a simplified diagram of a method 400 of incorporating non-virtual reality content in a virtual and/or augmented environment according to some embodiments. One or more of the processes 410-490 of method 400 may be implemented, at least in part, in the form of executable code stored on non-transitory, tangible, machine readable media that when run by one or more processors (e.g., processor 220 in computing device 210) may cause the one or more processors to perform one or more of the processes 410-490. For example, method 400 may be implemented by virtual reality system 260. Although the processes of method 400 are drawn in an apparent order, one of ordinary skill would understand that processes 410-490 may be performed in other orders and/or one or more of the processes may be performed concurrently. In some examples, processes 410 and 420 may be performed multiple times to add additional virtual screens to the virtual and/or augmented environment before any of the virtual screens are selected and manipulated. In some examples, processes 430-490 may be performed multiple times to repeatedly select and manipulate virtual screens before processes 410 and 420 are used to add additional virtual screens to the virtual and/or augmented environment. In some examples, processes 480 and/or 490 may be performed concurrently with process 450 so that as the virtual screen is manipulated, the audio and/or lighting impact of the manipulation may be observed in the virtual and/or augmented environment. In some embodiments, one or more of the processes 460, 480, and/or 490 are optional and may be omitted. In some embodiments, method 400 may include additional processes that are not shown.

Figure 5:
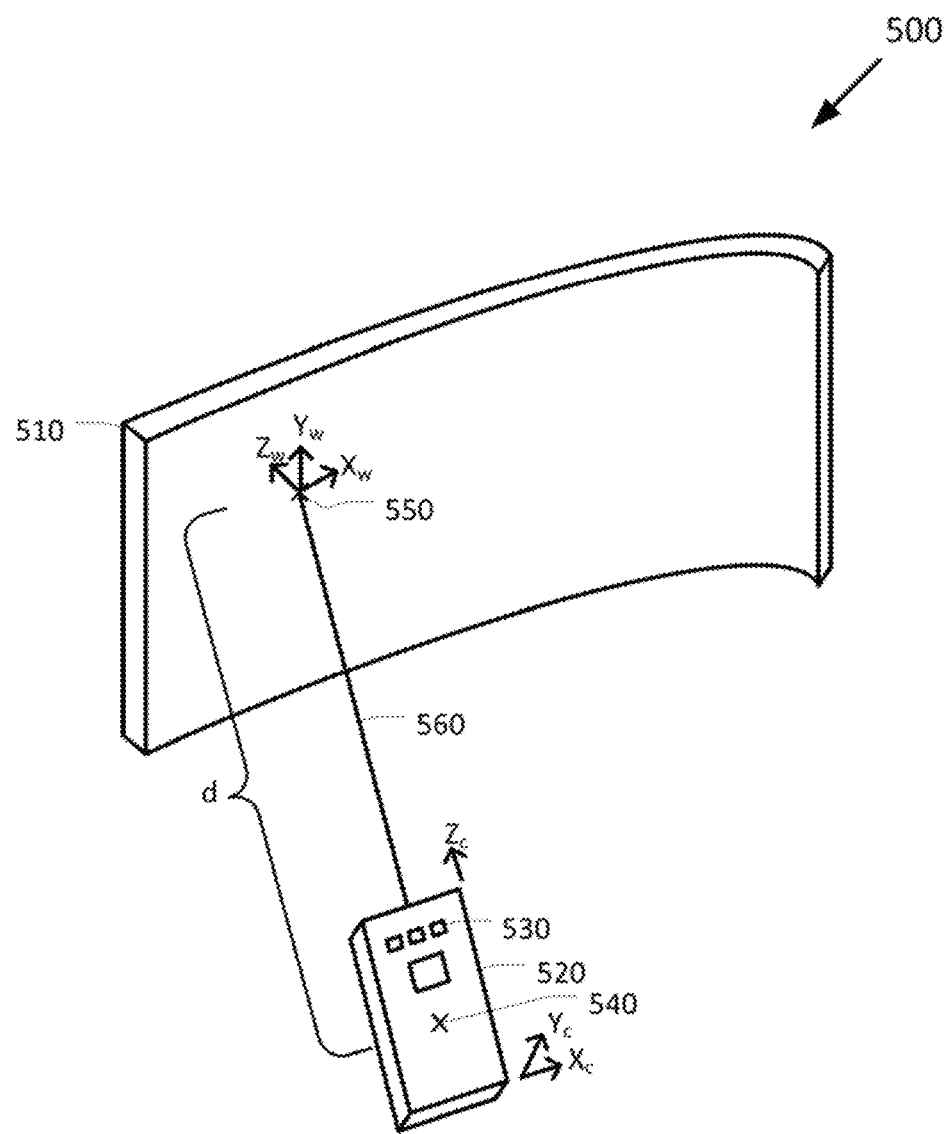
FIG. 5 is a simplified diagram of virtual screen manipulation according to some embodiments.

Some embodiments of method 400 are now discussed in the context of FIG. 5, which is a simplified diagram of virtual screen manipulation 500 according to some embodiments. As shown in FIG. 5, a virtual screen 510, consistent with any of virtual screens 134, 330, and/or 340, is shown in a virtual and/or augmented environment. Also shown is a virtual controller 520, consistent with any of the virtual controllers 132 and/or 350, with a plurality of input controls such as the three buttons and touchpad shown in FIG. 5. Virtual controller 520 is further associated with a representative point 540 in the virtual reality space as well as an orientation characterized by the axes $X_c$, $Y_c$, and $Z_c$. Virtual controller 520 is directed toward a point 550 on virtual screen 510 as further indicated by the pointing ray 560. Position and orientation of point 550 on virtual screen 510 is similarly characterized by the axes Xw, Yw, and Zw. The distance between representative point 540 and point 550 on virtual screen 510 is indicated by the distance d.

Referring back to FIG. 4, at a process 410, a window source is selected. In some examples, a user using any of the one or more computer input devices 114 and/or virtual reality input devices 111 may select a window source associated with a regular display (e.g., flat screen display) and/or one that is already included in the virtual and/or augmented environment. In some examples, the user may select an application and/or a file associated with a content displaying application on the regular display using a mouse or similar input device and then activate a pop-up menu selection to open the application or file within the virtual and/or augmented environment. In some examples, the pop-up menu may be activated using a right click on the mouse, a shift click, and/or the like. In some examples, the user may perform a similar action on a virtual screen, such as virtual screen 330 used to display a desktop, and open an application or file within the virtual and/or augmented environment, which may have a default to open any such resulting windows in the virtual and/or augmented environment.

At a process 420, the window source is composited into the virtual and/or augmented environment as a virtual screen. Once the source window is designated for opening in the virtual and/or augmented environment during process 410, it is rendered as a virtual screen and then composited in the virtual and/or augmented environment, such as by compositor 141. Content for the window source may be obtained by accessing the visual content of the corresponding window on the regular screen (e.g., via an API or by accessing the display buffer), receiving the content directly from the application rendering the content (e.g., using one or more threads set-up for inter-process communication with the application), and/or the like. The properties of the virtual screen, such as a location, orientation, and/or shape of the virtual screen, may be set by default parameters and/or may be solicited by the virtual reality system using one or more pop-up menus or dialogs. In some examples, the distance of the virtual screen from the user, the orientation of the virtual screen relative to the user, the size of the virtual screen, the curvature of the virtual screen, the sound properties, the illumination properties, and/or the like may be set and/or subject to default settings. In some examples, the default settings may include placing the virtual screen at a preset distance from the user with a center point of the virtual screen centered along the direction of view of the user. In some examples, the virtual screen may be placed in the virtual and/or augmented environment in an auto-arranged fashion according to a scheme such as tiling, cascading, and/or the like.

In some examples, the curvature of the virtual screen may be set based on a location of a center of curvature located at the user, a preset distance in front of the user along the direction of view, a preset distance behind the user along the reverse projected direction of view, and/or at infinity to generate a flat virtual screen. Curvature of the virtual screen may be manipulated in one or two directions so that the virtual display is rendered as if the virtual screen were wrapped around a cylinder or a sphere, respectively. Other curvature and shapes are also possible. In some examples, the virtual screen is oriented with respect to vertical in the virtual and/or augmented environment and/or consistent with the view right and view up vectors characterizing the user's viewing frame of the virtual and/or augmented environment. Once the location, orientation, size, curvature, and/or the like of the virtual screen is determined, it is composited in the virtual and/or augmented environment subject to the other objects and environmental elements in the virtual and/or augmented environment so that portions of the virtual screen behind other objects are hidden and the virtual screen hides portions of objects the virtual screen is in front of. In some examples, depth buffering and/or z-buffering may be used to hide the portions of the other objects and/or the portions of the virtual screen.

In some examples, any sound associated with the window source may also be incorporated into the virtual and/or augmented environment using an appropriate API or CODEC, depending on whether the sound associated with the window source is to be modeled as a background, a point, and/or a directional sound source. Similarly, any contributions the window source is to make to the illumination of the virtual and/or augmented environment may be similarly incorporated using an appropriate API or CODEC, depending on whether the virtual screen is to be treated as a point, area, and/or directional light source.

At a process 430, a virtual screen is selected. Using any of the one or more computer input devices 114 and/or virtual reality input devices 111, the user may select one of the virtual screens in the virtual and/or augmented environment for manipulation. In some examples, the user may use a key combination on a keyboard (e.g., Alt-Tab or similar) to cycle through the virtual screens with each active screen being highlighted by a border change, flashing, and/or the like to select the virtual screen. In some examples, the virtual screen may be selected based on the direction of the user's gaze within the virtual and/or augmented environment. In some examples, the user may select a point within a corresponding window on the regular display of the computing device, such as by a mouse click. In the examples of FIG. 5, the user may aim virtual controller 520 at virtual window 510 as aided by pointing ray 560 and press a designated one of the buttons among input controls 530. Selection of virtual screen 510 and/or point 550 may be indicated by a border change, flashing, change in a cursor, triggering of a pop-up, drop-down, or other style menu, an audio tone, and/or the like within the virtual and/or augmented environment. In some examples, the menu may be rendered on the virtual screen. In some examples, selection of the virtual screen may also result in the corresponding window on the display of the underlying computing system to become the window of focus that that user input from the input devices of the underlying computing system (e.g., the one or more computer input devices 114) may result in corresponding interaction with the corresponding window.

At a process 440, the virtual screen selected during process 430 is made semi-transparent. In order to aid in the manipulation of the virtual screen within the virtual and/or augmented environment, the virtual screen is made semi-transparent so that as it is moved around in front of other virtual screens and/or objects the user may still track the location of the virtual screen relative to those other virtual screens and/or objects. In some examples, an alpha blending factor for the virtual screen may be adjusted so that it becomes partially transparent when it is rendered in the color buffer.

At a process 450, the virtual screen is manipulated by the user. In some examples, the user may manipulate the virtual screen using one or more dialogs that allow the user to select and/or change any of the properties of the virtual screen. In the examples, of FIG. 5, the user may use virtual controller 520 and the input controls 530 to manipulate the virtual screen. In some examples, movement of virtual controller 520 is converted to corresponding motion of virtual screen 510 as if a rigid link of length d exists between representative point 540 on virtual controller 520 and point 550 on virtual screen 510. Thus, translations up, down, forward, back, left, and right of virtual controller 520 are converted to equivalent translations of virtual screen 510, and rotations of virtual controller 520 about representative point 540, around any combination of the axes Xc, Yc, and/or Zc, are converted to rotations of point 550 about representative point 540. In some examples, when the length d of the rigid link is zero, the orientation of virtual screen 510 changes to match changes in the orientation of virtual controller 520 even though virtual controller 520 and virtual screen 510 may be spatially translated relative to each other in the virtual and/or augmented environment. In some examples, rotation of virtual screen 510 about axis Yw may be made by left and/or right swipes on a touchpad; use of a dedicated slider bar, scroll wheel, or rocker switch; and/or the like included in input controls 530. In some examples, resizing of virtual screen 510 may be made by up and/or down swipes on the touchpad; use of a dedicated slider bar, scroll wheel, or rocker switch; and/or the like included in input controls 530. In some examples, adjusting the curvature of virtual screen 510 may be made by left and/or right side taps of the touchpad; use of a dedicated slider bar, scroll wheel, or rocker switch; and/or the like included in input controls 530. In some examples, changing the distance d between representative point 540 and point 550 may be made by top and/or bottom edge taps of the touchpad; use of a dedicated slider bar, scroll wheel, or rocker switch; and/or the like included in input controls 530.

In some embodiments, the detected movement of virtual controller 520 is smoothed to reduce unwanted shaking of virtual screen 510 while it is being manipulated. In some examples, the unwanted shaking may occur as a result of unsteadiness of the hand holding virtual controller 520, sensor noise and/or error, movements caused by manipulation of the various buttons, slider bars, scroll wheels, switches, touch pads, and/or the like during the manipulation process, and/or other sources. In some examples, the smoothing may include filtering the detected movement. In some examples, the filtering may include low-pass filtering. In some examples, a level of filtering may be adjusted based on a detected translational and/or rotational velocity of virtual controller 520.

In some examples, the adjustments to virtual screen 510 directed by manipulation of virtual controller 520 and input controls 530 may be implemented using appropriate transforms, such as homogeneous transforms, for translation, scaling, rotation, rotation about a point, and/or the like as is known in the art. In some examples, manipulation of the virtual screen may further include changing any of the sound and/or illumination properties of the virtual screen. When manipulation of virtual screen 510 is complete, the user may activate a dedicated button of input controls 530 to exit virtual screen manipulation mode. In some examples, when the user finishes manipulating virtual screen 510, the user may depress the button from input controls 530 used to select virtual screen during process 430, select a "done" icon or widget displayed in the virtual and/or augmented environment, and/or the like to signal that virtual screen manipulation is complete.

At an optional process 460, the virtual screen is snapped to the environmental orientation. Because most computer windows are oriented so that screen up (e.g., Yw in the embodiments of FIG. 5) is vertically up in the physical world, the user may optionally configure the manipulation of virtual screens to that when manipulation of a virtual screen is completed and screen up of the virtual screen is oriented within a predetermined threshold angle (such as 10 degrees or less) of up in the virtual and/or augmented environment, the orientation of screen up of the virtual screen may be automatically snapped to up in the virtual and/or augmented environment. In some embodiment, orientation of the virtual screen may also be adjusted based on the orientation of the virtual screen relative to the user in the virtual and/or augmented environment. In some examples, when the user's direction of view is within a predetermined threshold angle (such as 10 degrees or less) of the direction the virtual screen is facing (e.g., Zw in the embodiments of FIG. 5), the virtual screen may be oriented to face directly toward the user.

At the process 470, the opacity of the virtual screen is restored. Once manipulation of the virtual screen is complete and its final position is determined, the opacity of the virtual screen is restored and it is rendered along with the other objects in the virtual and/or augmented environment based on depth relative to the user. In some examples, the opacity of the virtual screen and/or objects in front of the virtual screen may be restored by adjusting the alpha blending factor for the virtual screen and/or the objects.

At an optional process 480, the audio sources for the virtual screens are relocated. When the audio associated with the virtual screen is associated with a point and/or a directional sound source, the location and/or direction of the sound source is updated to reflect the new position and/or orientation of the virtual screen. When the audio associated with the virtual screen is associated with a background sound source, the volume of the background sound source may optionally be adjusted based on any change in distance between the user and the virtual screen within the virtual and/or augmented environment. Changes to the audio may be implemented using the appropriate API and/or CODEC.

At an optional process 490, the light sources for the virtual screens are relocated. When the virtual screen is contributing to the illumination of the virtual and/or augmented environment, the new position and/or orientation of the virtual screen is used to update the point, area, and/or directional effects of the illumination provided by the virtual screen. Changes to the illumination may be implemented using the appropriate API and/or CODEC.

As discussed above and further emphasized here, FIGS. 4 and 5 are merely examples which should not unduly limit the scope of the claims. One of ordinary skill in the art would recognize many variations, alternatives, and modifications. In some embodiments, the selection of the window source during process 410, the selection of a virtual screen during process 430, and/or the manipulation of the virtual screen during process 450 may be accomplished using virtual controls other than virtual controller 520 of FIG. 5. In some examples, the user's hands and/or one or more virtual hands corresponding to the user's hands may be used as the virtual controller used to interact with the virtual and/or augmented environment. In some examples, motions of the user's hand and fingers (e.g., waves, swipes, pinches, finger flexes, and/or the like) captured by one or more sensors, such as the one or more sensors 121, may be used as one or more commands to the virtual and/or augmented environments. These one or more commands may be used to perform the selections of processes 410 and/or 430 and/or the manipulations of process 450.

In some embodiments, method 400 may be used to select and/or manipulate items other than virtual screens. In some examples, method 400 may be used to select and manipulate elements from the background and environment 131, the one or more virtual objects 133, and/or the like. In some examples, selection of the element may be indicated by a border change, color change, flashing, change in a cursor, triggering of a pop-up menu, an audio tone, and/or the like within the virtual and/or augmented environment. In some examples, the pop-up menu may appear as a semi-transparent menu located on or near the virtual controller and/or the user's hand or fingers used to select the element. In some examples, the pop-up menu may appear as a heads-up style display between the virtual controller and/or the user's hands or fingers used to select the element and the selected element.

In some embodiments, the menus, widgets, gadgets, and/or the like used to select and/or manipulate the one or more virtual screens 134, the elements from the background and environment 131, the one or more virtual objects 133, and/or the like may provide access to actions besides the selection and/or manipulation actions. In some examples, the menus, widgets, gadgets, and/or the like may include options to create a duplicate virtual screen, element, or virtual object; request related content for display in the virtual and/or augmented environment; make a purchase; follow a hyperlink; and/or the like. In some examples, the menus, widgets, gadgets, and/or the like may be coded using any suitable user interface library, markup language, and/or the like. In some examples, the menus, widgets, gadgets, and/or the like may be coded as a web page, a web form, and/or an applet using Hypertext Markup Language (HTML) and/or the like.

Some examples of the virtual reality systems described herein may include non-transient, tangible, machine readable media that include machine-readable instructions that when run by one or more processors (e.g., processor 220) may cause the one or more processors to perform the processes and methods described herein. Some common forms of machine readable media that may include the processes and methods are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method comprising:
receiving, by one or more processors, a selection of content for display on a window of a computing system;
rendering, by the one or more processors, the content as a virtual screen, the virtual screen being independently rotationally orientable about any combination of x, y, or z axes in a virtual or augmented reality environment from one or more other virtual screens corresponding to other windows of the computing system;
compositing, by the one or more processors, the virtual screen into the virtual or augmented reality environment;
rendering a hand-held input device as a virtual controller spaced from the virtual screens, the virtual controller being manipulatable as a virtual object within the virtual or augmented reality environment, the virtual controller having one or more rendered input controls;
rendering a pointing ray extending from the virtual controller;
detecting, by the one or more processors, a selection of the virtual screen using a virtual controller, based on a gaze of a user within the virtual or augmented reality environment, or both, and representing said selection in the virtual or augmented reality environment as selection by the virtual controller aiming at the virtual screen from a distance as aided by the pointing ray;
changing, by the one or more processors, an orientation of the virtual screen about any combination of the x, y, or z axes in the virtual or augmented reality environment independent of an orientation of the one or more other virtual screens based on manipulation of the virtual controller by the user so that rotations of the hand-held input device result in corresponding rotations of the virtual screen as if the virtual controller and the virtual screen are connected via a rigid link between a representative point on the virtual controller and a point on the virtual screen, the rigid link extending along the pointing ray, the pointing ray reaching said point on the virtual screen, wherein the manipulation of the virtual controller corresponds to a filtered version of a manipulation of the hand-held input device by a user;
automatically reorienting the virtual screen, after the virtual screen is deselected, to align a screen up direction of the virtual screen with a view up direction of virtual or augmented reality environment when the screen up direction of the virtual screen is within a first angular separation from the view up direction of the virtual or augmented reality environment;
automatically reorienting the virtual screen, after the virtual screen is deselected, to align an orientation of the virtual screen with a direction of view of the user when the orientation of the virtual screen is within a second angular separation from the direction of view of the user;
relocating, after the virtual screen is deselected, a sound source associated with the virtual screen based on a change in location or the orientation of the virtual screen due to the manipulation of the virtual controller; and
relocating, after the virtual screen is deselected, an illumination source associated with the virtual screen based on a change in location or the orientation of the virtual screen due to the manipulation of the virtual controller, the illumination source contributing to illumination of the virtual or augmented reality environment as a computer screen displaying a same video content as being displayed on the virtual screen would illuminate a real environment.

2. The method of claim 1, wherein each of the one or more rendered input controls being selected from a group consisting of a button, a touchpad, a slider bar, a scroll wheel, and a rocker switch.

3. The method of claim 2, further comprising:
changing one or more properties of the virtual screen, the one or more properties including one or more of a position of the virtual screen, a size of the virtual screen, or the orientation of the virtual screen;
wherein:

the changing of the position of the virtual screen is based on changes in a position of the hand-held input device as if the virtual controller and the virtual screen are connected by rigid link; and the changing of the size of the virtual screen is based on up and down swipes on a touchpad, movement of a slider bar, rotation of a scroll wheel, or activation of a rocker switch.

4. The method of claim 1, further comprising using the virtual screen to obtain a virtual object corresponding to an element displayed on the virtual screen.

5. The method of claim 1, further comprising saving a state of the virtual or the augmented reality environment.

6. The method of claim 1, further comprising adding a sound source to the virtual or augmented environment when the content includes an audio component.

7. The method of claim 1, further comprising using the virtual screen as an illumination source for one or more other virtual objects within the virtual or augmented environment.

8. The method of claim 1, further comprising aligning the virtual screen with an up direction in the virtual or augmented reality environment.

9. The method of claim 1, further comprising aligning the virtual screen so it is directed toward the user in the virtual or augmented environment.

10. The method of claim 1, wherein changing the orientation of the virtual screen comprises temporarily changing a transparency of the virtual screen so that it becomes semi-transparent when the virtual screen is selected and an opacity of the virtual screen is restored after the orientation is changed.

11. The method of claim 1, wherein the user may navigate past or move behind the virtual screen within the virtual or augmented environment.

12. The method of claim 1, further comprising rendering a respective menu for each of the virtual screen and the other virtual screens, each respective menu being usable by the user to manipulate a corresponding virtual screen.

13. The method of claim 1, wherein a level of the filtering is adjusted based on a translational or a rotational velocity of the hand-held input device.

14. A system comprising:
a head-mounted display;
a hand-held controller; and
one or more processors coupled to the head-mounted display and the hand-held controller, the one or more processors being configured to:
receive a selection of content for display on a window of a computing system;
render the content as a virtual screen, the virtual screen being independently rotationally orientable about any combination of x, y, or z axes in a virtual or augmented reality environment from one or more other virtual screens corresponding to other windows of the computing system;
render the hand-held controller as a virtual controller, the virtual controller being manipulatable as a virtual object within the virtual or augmented reality environment, the virtual controller having one or more rendered input controls;
composite the virtual screen and the virtual controller into the virtual or augmented reality environment displayed on the head-mounted display;
detect a selection of the virtual screen by a user;
represent a selection of the virtual screen as selected by the virtual controller in the virtual or augmented reality environment when the virtual controller is at a distance from the virtual screen, wherein representing the selection of the virtual screen comprises:
rendering the virtual controller to aim at the virtual screen from a distance;
rendering a pointing ray extending from the virtual controller to the virtual screen; and
rendering a manipulation of the one or more rendered input controls of the virtual controller to select the virtual screen by the virtual controller aiming at the virtual screen from a distance;
change an orientation of the virtual screen about any combination of the x, y, or z axes in the virtual or augmented reality environment independent of an orientation of the one or more other virtual screens based on manipulation of the virtual controller by the user so that rotations of the hand-held controller result in corresponding rotations of the virtual screen as if the pointing ray is at least part of a rigid link connecting a representative point on the virtual controller to a point where the pointing ray meets the virtual screen, wherein the manipulation of the virtual controller corresponds to a filtered version of a manipulation of the hand-held controller by a user;
automatically reorienting the virtual screen, after the virtual screen is deselected, to align a screen up direction of the virtual screen with a view up direction of virtual or augmented reality environment when the screen up direction of the virtual screen is within a first angular separation from the view up direction of the virtual or augmented reality environment;
automatically reorienting the virtual screen, after the virtual screen is deselected, to align an orientation of the virtual screen with a direction of view of the user when the orientation of the virtual screen is within a second angular separation from the direction of view of the user;
relocating, after the virtual screen is deselected, a sound source associated with the virtual screen based on a change in location or the orientation of the virtual screen due to the manipulation of the virtual controller; and
relocating, after the virtual screen is deselected, an illumination source associated with the virtual screen based on a change in location or the orientation of the virtual screen due to the manipulation of the virtual controller, the illumination source contributing to illumination of the virtual or augmented reality environment as a computer screen displaying a same video content as being displayed on the virtual screen would illuminate a real environment.

15. The system of claim 14, wherein:
the one or more processors are further configured to change one or more of a position of the virtual screen or, a size of the virtual screen, or the orientation of the virtual screen;
the change in the position of the virtual screen is based on changes in position of the hand-held controller as if the virtual controller and the virtual screen are connected by the rigid link; and
the change of the size of the virtual screen is based on up and down swipes on a touchpad, movement of a slider bar, rotation of a scroll wheel, or activation of a rocker switch.

16. The system of claim 14, wherein the one or more processors are further configured to add a sound source to the virtual or augmented reality environment when the content includes an audio component, use the virtual screen as an illumination source for one or more other virtual objects within the virtual or augmented reality environment, or both.

17. The system of claim 14, wherein the one or more processors are further configured to align the virtual screen with an up direction in the virtual or augmented reality environment, so it is directed toward the user in the virtual or augmented environment, or both.

18. A non-transitory computer-readable medium comprising a plurality of machine-readable instructions which when executed by one or more processors associated with a virtual or augmented reality system are adapted to cause the one or more processors to perform a method comprising:
   receiving a selection of content for display on a window of a computing system;
   rendering the content as a virtual screen, the virtual screen being independently rotationally orientable about any combination of x, y, or z axes in the virtual or augmented reality environment from one or more other virtual screens corresponding to other windows of the computing system;
   rendering a hand-held controller as a virtual controller, the virtual controller being manipulatable as a virtual object within the virtual or augmented reality environment, the virtual controller having one or more rendered input controls, each of the one or more rendered input controls being selected from a group consisting of a button, a touchpad, a slider bar, a scroll wheel, and a rocker switch;
   compositing the virtual screen into the virtual or augmented reality environment;
   rendering a pointing ray extending from the virtual controller;
   detecting a selection of the virtual screen by detecting that the virtual controller is aiming toward the virtual screen from a distance as indicated by the pointing ray;
   changing an orientation of the virtual screen about any combination of the x, y, or z axes in the virtual or augmented reality environment independent of an orientation of the one or more other virtual screens based on manipulation of the virtual controller by a user so that rotations of the hand-held controller result in corresponding rotations of the virtual screen as if the virtual controller and the virtual screen are connected via a rigid link between a representative point on the virtual controller and a point on the virtual screen, the rigid link extending along the pointing ray, the pointing ray reaching said point on the virtual screen, wherein the manipulation of the virtual controller corresponds to a filtered version of a manipulation of the hand-held controller by a user;
   automatically reorienting the virtual screen, after the virtual screen is deselected, to align a screen up direction of the virtual screen with a view up direction of virtual or augmented reality environment when the screen up direction of the virtual screen is within a first angular separation from the view up direction of the virtual or augmented reality environment;
   automatically reorienting the virtual screen, after the virtual screen is deselected, to align an orientation of the virtual screen with a direction of view of the user when the orientation of the virtual screen is within a second angular separation from the direction of view of the user;
   relocating, after the virtual screen is deselected, a sound source associated with the virtual screen based on a change in location or the orientation of the virtual screen due to the manipulation of the virtual controller; and
   relocating, after the virtual screen is deselected, an illumination source associated with the virtual screen based on a change in location or the orientation of the virtual screen due to the manipulation of the virtual controller, the illumination source contributing to illumination of the virtual or augmented reality environment as a computer screen displaying a same video content as being displayed on the virtual screen would illuminate a real environment.

19. The non-transitory computer-readable medium of claim 18, wherein the method further comprises:
   changing one or more of a curvature, a position, and an orientation of the virtual screen, the changing of the position of the virtual screen being based on movement of the hand-held controller as if the virtual controller and the virtual screen are connected by the rigid link.

20. The non-transitory computer-readable medium of claim 18, wherein the method further comprises adding a sound source to the virtual or augmented reality environment when the content includes an audio component, using the virtual screen as an illumination source for one or more other virtual objects within the virtual or augmented reality environment, or both.

* * * * *